United States Patent
Chen

(10) Patent No.: US 11,051,265 B2
(45) Date of Patent: Jun. 29, 2021

(54) METHOD AND DEVICE FOR SYNCHRONIZATION BETWEEN BASE STATIONS

(71) Applicant: DATANG MOBILE COMMUNICATIONS EQUIPMENT CO., LTD., Beijing (CN)

(72) Inventor: Jie Chen, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 16/960,323

(22) PCT Filed: Jan. 3, 2019

(86) PCT No.: PCT/CN2019/070254
§ 371 (c)(1),
(2) Date: Jul. 7, 2020

(87) PCT Pub. No.: WO2019/137293
PCT Pub. Date: Jul. 18, 2019

(65) Prior Publication Data
US 2020/0374824 A1     Nov. 26, 2020

(30) Foreign Application Priority Data

Jan. 9, 2018   (CN) .......................... 201810018339.2

(51) Int. Cl.
*H04W 56/00*     (2009.01)
*H04L 5/00*      (2006.01)
(Continued)

(52) U.S. Cl.
CPC ....... *H04W 56/0015* (2013.01); *H04L 5/0048* (2013.01); *H04L 27/2613* (2013.01);
(Continued)

(58) Field of Classification Search
CPC ................................................. H04W 56/0015
See application file for complete search history.

(56) References Cited

U.S. PATENT DOCUMENTS

| 2013/0028161 A1* | 1/2013 | Maeda ............ H04W 72/0406 370/311 |
| 2013/0121222 A1* | 5/2013 | Luo ................. H04W 36/0061 370/311 |

(Continued)

FOREIGN PATENT DOCUMENTS

| CN | 102014405 A | 4/2011 |
| CN | 102026363 A | 4/2011 |

(Continued)

OTHER PUBLICATIONS

ZTE,"The support of radio-interface based synchronization mechanisms", 3GPP TSG-RAN WG3 Meeting #81, Barcelona, Spain, Aug. 19-23, 2013, total 5 pages, RJ-131361.

(Continued)

*Primary Examiner* — Edan Orgad
*Assistant Examiner* — Won Tae C Kim
(74) *Attorney, Agent, or Firm* — Kilpatrick Townsend & Stockton, LLP

(57) ABSTRACT

The present disclosure relates to the field of communications, and discloses a method and device for synchronization between base stations to reduce listening costs and to make the best use of radio resources. The method is: a slave base station receiving, on a designated symbol of a special sub-frame via a primary radio frequency integrated circuit (RFIC), a cell reference signal (CRS) sent by a master base station, and performing synchronization between the slave base station and the master base station according to the acquired CRS.

13 Claims, 5 Drawing Sheets

(51) Int. Cl.
*H04L 27/26* (2006.01)
*H04W 72/04* (2009.01)
*H04W 88/08* (2009.01)

(52) U.S. Cl.
CPC ..... *H04W 72/042* (2013.01); *H04W 72/0446* (2013.01); *H04W 88/08* (2013.01)

(56) References Cited

U.S. PATENT DOCUMENTS

| | | | | |
|---|---|---|---|---|
| 2014/0334399 | A1* | 11/2014 | Xu | H04W 56/0015 370/329 |
| 2015/0327202 | A1* | 11/2015 | Xu | H04W 56/0015 370/280 |
| 2016/0044663 | A1* | 2/2016 | Yao | H04L 1/1671 370/336 |
| 2016/0302167 | A1 | 10/2016 | Yi et al. | |
| 2018/0007605 | A1* | 1/2018 | Eriksson | H04W 36/30 |

FOREIGN PATENT DOCUMENTS

| | | |
|---|---|---|
| CN | 102271391 A | 12/2011 |
| CN | 102761956 A | 10/2012 |
| CN | 102769906 A | 11/2012 |
| CN | 102802257 A | 11/2012 |
| CN | 103516419 A | 1/2014 |
| CN | 103516420 A | 1/2014 |
| CN | 104812049 A | 7/2015 |
| EP | 3200519 A1 | 8/2017 |

OTHER PUBLICATIONS

Nokia et al.,"Text Proposal for TR 36.922: TDD HeNB Synchronization using Network Listening", 3GPP TSG-RAN WG4 Ad Hoc #1, Sophia Antipolis, France,Jan. 18-22, 2010, total 7 pages, R4-10XXXX.

3GPP TR 36.922 V11.0.0, 3rd Generation Partnership Project;Technical Specification Group Radio Access Network; Evolved Universal Terrestrial Radio Access (E-UTRA);TDD Home eNode B (HeNB) Radio Frequency (RF) requirements analysis, Release 11, total 74 pages, Sep. 2012.

* cited by examiner

| Configuration serial number | Special subframe symbol ratio | | | | | | | | | | | | | |
|---|---|---|---|---|---|---|---|---|---|---|---|---|---|---|
| 0 | 3 | | | | | | | | | | 10 | | | 1 |
| 1 | 9 | | | | | | | | | | 4 | | | 1 |
| 2 | 10 | | | | | | | | | | | 3 | | 1 |
| 3 | 11 | | | | | | | | | | | 2 | | 1 |
| 4 | 12 | | | | | | | | | | | | 1 | 1 |
| 5 | 3 | | | | | | | | | 9 | | | | 2 |
| 6 | 9 | | | | | | | | | | 3 | | | 2 |
| 7 | 10 | | | | | | | | | | | 2 | | 2 |
| 8 | 11 | | | | | | | | | | | 1 | | 2 |

(DWPTS symbol) (GP symbol) (UpPTS symbol)

METHOD AND DEVICE FOR SYNCHRONIZATION BETWEEN BASE STATIONS

This application is a national stage application of International Application No. PCT/CN2019/070254, filed on Jan. 3, 2019, which claims priority to Chinese patent application No. 201810018339.2, filed with Chinese Patent Office on Jan. 9, 2018, entitled "Method and Device for Synchronization Between Base Stations", which is incorporated herein by reference in its entirety.

FIELD

The present disclosure relates to the field of communications, and in particular to a method and device for synchronization between base stations.

BACKGROUND

In a communication system, to avoid crossing of transmission and reception time slots between neighboring base stations, and to minimize interference between base stations, synchronization between base stations is the most critical process.

Synchronization between base stations is usually achieved by the following two processes.

A first solution is: as shown in FIG. 1, each base station monitors neighboring base stations by using an independent radio frequency integrated circuit (RFIC), acquires synchronization information, frequency synchronization information, and neighboring cell information, and then transmits relevant information to a baseband processing element through an interface between the RFIC and the baseband processing element.

However, in the first solution, independent RFICs need to be deployed in the base stations, which can increase costs of hardware and is not conducive to wide applications.

A second solution is: referring to FIG. 2, a primary RFIC of a base station is multiplexed, and a specialmulticast/broadcast single frequency network (MBSFN) subframe is configured in a reception time slot to implement air interface listening. As shown in FIG. 2, the MBSFN subframe may be configured in a slave base station (that is, a slave cell), so that the slave base station monitors a synchronization signal from a master base station (that is, a sync source cell) by using the MBSFN subframe to implement synchronization between the base stations.

However, in the second solution, a special MBSFN subframe needs to be configured, which occupies normal reception and transmission time slots. This cannot make the best use of radio resources, and is prone to resource waste.

In view of this, a new method for monitoring an air interface is needed to overcome the above-mentioned shortcomings.

SUMMARY

Embodiments of the present disclosure provide a method and device for synchronization between base stations to make the best use of radio resources while reducing listening costs.

The embodiments of the present disclosure provide a method for synchronization between base stations. The method includes: receiving, by a slave base station, a CRS sent by a master base station, on a specific symbol in a special subframe via a primary RFIC; and performing, the slave base station, synchronization between the slave base station and the master base station according to the received CRS.

In one embodiment, before the receiving, by the slave base station, the CRS sent by a master base station, on the specific symbol in the special subframe via the primary RFIC, the method further includes: after startup, acquiring, by the slave base station, neighboring cell information of neighboring base stations by scanning the neighboring base stations within a frequency band supported by the slave base station, where the neighboring cell information includes at least signal transmitting powers of the neighboring base stations; and the slave base station selecting a neighboring base station from the neighboring base stations as the master base station, where the selected neighboring base station has a highest signal transmitting power among the acquired signal transmitting powers of the neighboring base stations and the highest signal transmitting power satisfies a preset power threshold.

In one embodiment, before the slave base station receiving the CRS sent by the master base station on the specific symbol in the special subframe via the primary RFIC, the method further includes: the slave base station determining that a preset synchronization tracking period has been reached.

In one embodiment, before the slave base station receiving the CRS sent by the master base station on the specific symbol in the special subframe via the primary RFIC, the method further includes: the slave base station switching from a transmitting state to a receiving state within a first duration before a start point of the specific symbol; and after the slave base station performing synchronization between the slave base station and the master base station according to the received CRS, the method further includes: the slave base station switching from the receiving state to the transmitting state within a second duration after an end point of the specific symbol.

In one embodiment, the first duration and the second duration are smaller than a duration occupied by a cyclic prefix (CP) used when the slave base station transmits a downlink data signal on each symbol.

In one embodiment, the slave base station performing synchronization between the slave base station and the master base station according to the received CRS includes: the slave base station synchronously adjusting a time domain position of a frame header locally maintained by the slave base station based on time synchronization information carried by the CRS; and the slave base station synchronously adjusting a vibrating frequency of a local crystal oscillator of the slave base station based on frequency synchronization information carried by the CRS.

In one embodiment, the specific symbol is a symbol 4 or a symbol 7 in the special subframe.

In one embodiment, the method further includes: the slave base station not scheduling physical downlink shared channel (PDSCH) data during the synchronization.

In one embodiment, the method further includes: the slave base station calculating an RSRP of the CRS; determining that the synchronization has failed when the currently calculated RSRP is smaller than a preset synchronization detection protection threshold, and RSRPs of the master base station calculated in the slave base station during the last consecutive N times of synchronization are smaller than the preset synchronization detection protection threshold; and reselecting another master base station.

A slave base station includes at least a baseband processing element and a primary RFIC, where: the baseband processing element is configured to receive a CRS sent by a master base station on a specific symbol of a special subframe via the primary RFIC; and perform synchronization between the slave base station and the master base station according to the received CRS; and the primary RFIC is configured to listen on the CRS sent by the master base station.

In one embodiment, the slave base station further includes: a baseband element configured to, after startup of the slave base station, acquire neighboring cell information of neighboring base stations by scanning the neighboring base stations within a frequency band supported by the slave base station, before the baseband processing element receives the CRS sent by the master base station on the specific symbol in the special subframe via the primary RFIC, where the neighboring cell information includes at least signal transmitting powers of the neighboring base stations; where the baseband processing element is further configured to: select a neighboring base station with the highest signal transmission power and satisfying a preset power threshold among the acquired signal transmitting powers of the neighboring base stations, as the master base station.

In one embodiment, before receiving the CRS sent by the master base station on the specific symbol in the special subframe via the primary RFIC, the baseband processing element is further configured to: determine that a preset synchronization tracking period has been reached.

In one embodiment, before receiving the CRS sent by the master base station, on the specific symbol in the special subframe via the primary RFIC, the baseband processing element is further configured to: switch from a transmitting state of the primary RFIC to a receiving state within a first duration before a start point of the specific symbol; and after performing synchronization between the slave base station and the master base station according to the received CRS, the baseband processing element is further configured to: switch from the receiving state of the primary RFIC to the transmitting state within a second duration after an end point of the specific symbol.

In one embodiment, the first duration and the second duration adopted by the baseband processing element are smaller than a duration occupied by a CP used when the primary RFIC transmits a downlink data signal on each symbol.

In one embodiment, when performing synchronization between the slave base station and the master base station according to the received CRS, the baseband processing element is configured to: synchronously adjust a time domain position of a frame header locally maintained by the slave base station based on time synchronization information carried by the CRS; and synchronously adjust a vibrating frequency of a local crystal oscillator of the slave base station based on frequency synchronization information carried by the CRS.

In one embodiment, the specific symbol adopted by the baseband processing element is a symbol 4 or a symbol 7 in the special subframe.

In one embodiment, the baseband element is further configured: not to schedule PDSCH data during the synchronization.

In one embodiment, the baseband processing element is further configured to: calculate a RSRP of the CRS; determine that the synchronization has failed when the currently calculated RSRP is smaller than a preset synchronization detection protection threshold, and RSRPs of the master base station calculated in the slave base station during the last consecutive N times of synchronization are smaller than the preset synchronization detection protection threshold, and reselect another master base station.

A slave base station receives by a primary RFIC, on a specific symbol of a special subframe, a CRS sent by a master base station; and performs synchronization between the slave base station and the master base station according to the received CRS. The slave base station monitors the master base station by multiplexing the primary RFIC, a separate RF circuit is not needed, effectively reducing costs of the hardware; in addition, the slave base station monitors the master base station on the specific symbol of the special subframe, which can ensure that only data transmission on one symbol of the special subframe is lost in one synchronization tracking cycle, so that compared with configuring a MBSFN sub-frame, the slave base station uses more symbols for PDSCH signal transmission, effectively making the best use of radio resources.

DETAILED DESCRIPTION OF THE EMBODIMENTS

Figure 1:
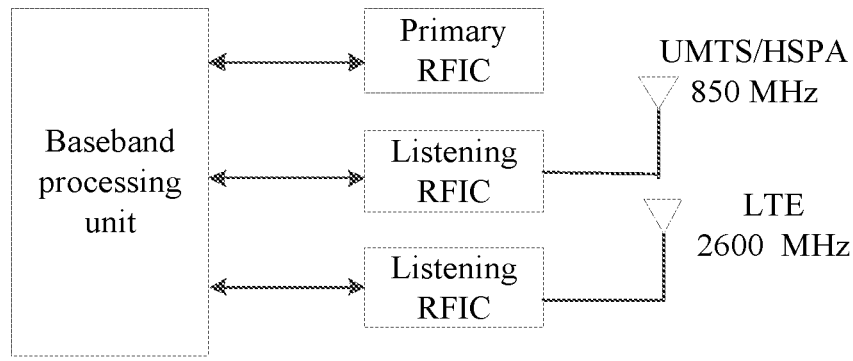
FIGS. 1 and 2 are schematic diagrams of air interface listening performed by a base station in the related art.
Figure 2:
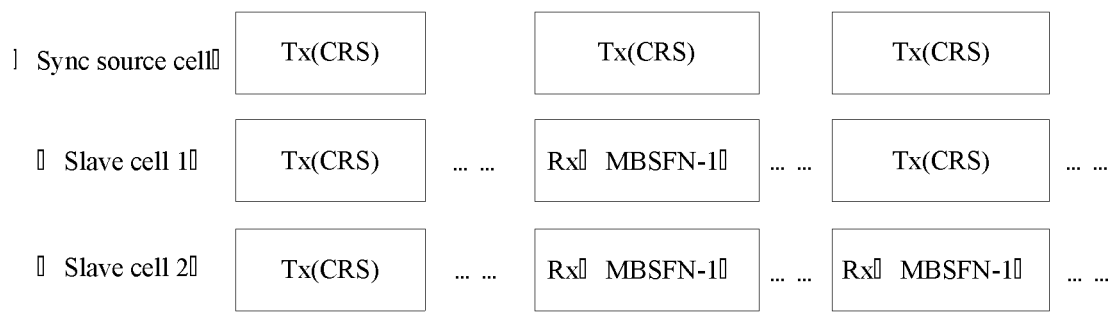

Embodiments of the present disclosure will be given below in conjunction with the drawings in the embodiments of the present disclosure. Apparently, the embodiments described are part of, rather than all of, the embodiments of the present disclosure.

Embodiments of the present disclosure can be applied to various communication systems, such as a global system of mobile communication (GSM) system, a code division multiple access (CDMA) system, a wideband code division multiple access (WCDMA) system, a general packet radio service (GPRS), a long term evolution (LTE) system, an advanced long term evolution (LTE-A) system, a universal mobile telecommunication system (UMTS), a new radio (NR), etc.

It should also be understood that in embodiments of the present disclosure, a user equipment (UE) includes but is not limited to a mobile station (MS), a mobile terminal, a mobile telephone, a handset, a portable equipment and the like. The user equipment can communicate with one or more core networks via a radio access network (RAN). For example, the user equipment may be a mobile phone (or "cellular" phone), a computer with a wireless communication function, or the like, and the user equipment may also be a portable, pocket, handheld, computer built-in or vehicle mounted mobile device.

In embodiments of the disclosure, a base station (e.g. an access point) can be a device in an access network that communicates with a wireless terminal through one or more sectors at an air interface. The base station can be used to perform conversion between a received air frame and IP packet as a router between the wireless terminal and the rest of the access network, and the rest of the access network can include an Internet Protocol (IP) network. The base station may also coordinate attribute management of the air interface. For example, the base station may be an evolved base station (eNodeB or eNB or e-NodeB, evolutional Node B) in LTE, or a base station (gNB) in 5G NR, but the present disclosure is not limited thereto.

To make the best use of radio resources while reducing listening costs, in embodiments of the present disclosure, when synchronization is achieved between base stations by listening an air interface, a slave base station multiplexes a primary RFIC of the slave base station and performs synchronization listening by using a special subframe of TD-LTE, that is, synchronization is performed by listening a cell reference signal (CRS) sent by a master base station through a downlink pilot time slot symbol (DwPTS symbol).

With embodiments of the present disclosure, in a time division long term evolution (TD-LTE) system, the slave base station performs listening through the air interface to achieve synchronization between base stations, and a series of schemes such as automatically acquiring neighboring cell information are achieved.

Embodiments can be applied to both macro base stations and small base stations, especially for small base stations, because air interface listening can simplify the installation of small base stations without installing GPS antennas. In addition, by automatically acquiring neighboring cell information, a plug-and-play function can be achieved for small base stations.

Embodiments of the present disclosure will be described in detail below in conjunction with the accompanying drawings.

In embodiments of the present disclosure, air interface listening includes two phases: initial listening and synchronization tracking.

First, the slave base station (either a macro station or a small base station) can enter the initial listening phase (also called an initial synchronization phase) during startup. During the initial listening phase, the slave base station can use a method similar to initial cell search to scan all neighboring base stations within its supported frequency band to obtain neighboring cell information of the neighboring base stations, and establish an evaluation list to save the obtained neighboring cell information. The neighboring cell information includes at least signal transmitting powers of the neighboring base stations (to determine the type of the neighboring base stations). The slave base station can select a neighboring base station with the highest signal transmission power and satisfying a preset power threshold as the master base station (also called a sync source cell).

The above description involves the most basic judgment, and usually a judgment may be made in combination with multiple types of information. For example, further, the aforementioned neighboring cell information may further include any one or any combination of the following information: signal received powers of the neighboring base stations, public land mobile network (PLMN) information of the neighboring base stations, uplink and downlink configuration of the neighboring base stations, special subframe configuration of the neighboring base stations, MBSFN configuration of the neighboring base stations, and cell global identifiers (CGIs) of the neighboring base stations.

The slave base station selects a neighboring base station as the master base station according to a multiple information combination.

Then, after the initial listening phase, the slave base station enters the synchronization tracking phase. During the synchronization tracking phase, the slave base station can monitor the CRS of the tracked master base station according to a preset cycle, and calculate a synchronization deviation, achieving synchronization between the slave base station and the master base station.

The embodiments of the present disclosure are executed for the synchronization tracking phase.

Figure 3:
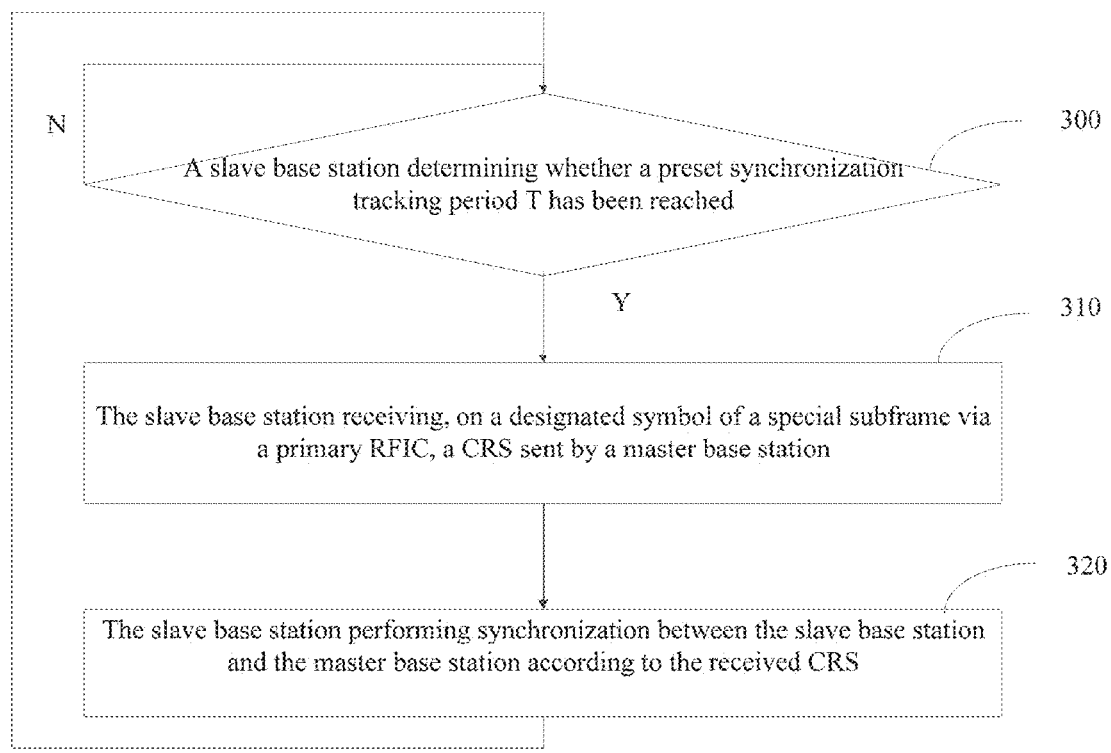
FIG. 3 is a flow diagram of an air interface listening performed by a base station in an embodiment of the present disclosure.

In one embodiment, referring to FIG. 3, in the embodiments of the present disclosure, a detailed process of air interface listening by a slave base station is as follows.

Step 300: a slave base station determines whether a preset synchronization tracking period T has been reached; if the preset synchronization tracking period T has been reached, executing step 310; if the preset synchronization tracking period T has not been reached, returning to step 300.

In one embodiment, in the synchronization tracking phase, the slave base station needs to set a synchronization tracking cycle T, periodically switch an operating frequency point of the slave base station to an operating frequency point of a master base station, and receive a CRS sent by the master base station through a special subframe.

Step 310: the slave base station receives on a specific symbol of a special subframe via a primary RFIC, a CRS sent by a master base station.

In a TD-LTE system, to achieve uplink and downlink conversion of a transceiver, a special subframe is designed, where the special subframe includes 14 symbols. The 14 symbols include DwPTS symbols, guard period symbols (GP symbols) and uplink pilot symbols (UpPTS symbols). For different configurations, the symbol ratios of the DwPTS symbols, the GP symbols and the UpPTS symbols are different. See FIG. 4A for details.

Since it is convenient for the slave base station to receive the CRS sent by the master base station on a DwPTS symbol, the specific symbol may be selected from the DwPTS symbols.

Figure 4A:
FIG. 4A is a schematic diagram of a configuration of a special subframe in an embodiment of the present disclosure.
Figure 4A:
Figure 4A:
Figure 4B:
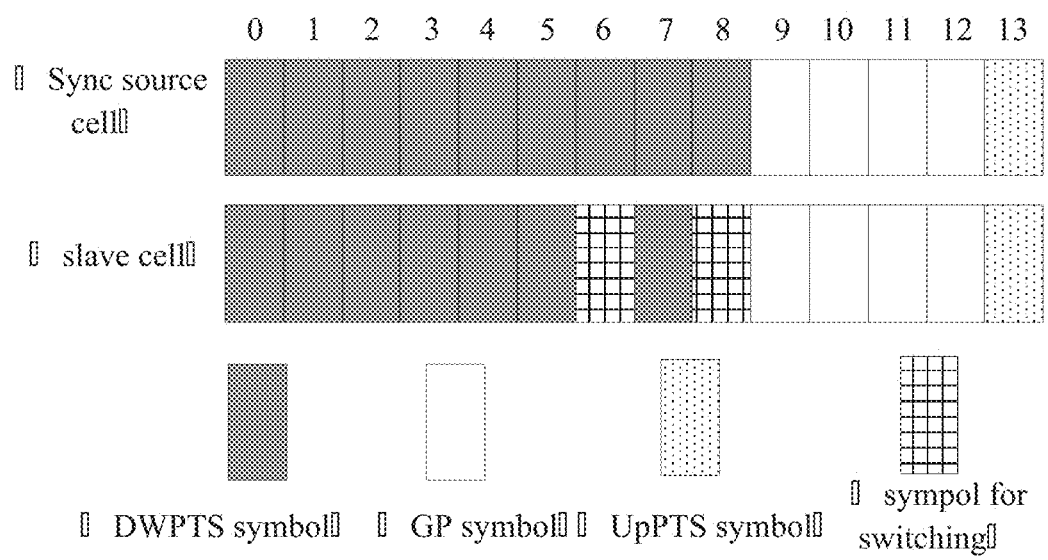
FIG. 4B is a structure diagram of a special sub-slot in a configuration 1 in an embodiment of the present disclosure.

Using configuration 1 shown in FIG. 4A as an example, referring to FIG. 4B, the symbol ratio of the DwPTS symbols, the GP symbols, and the UpPTS symbols is 9:4:1.

In theory, the master base station may send the CRS on symbols 0, 4, and 7 on the special subframe, and the slave base station may track the CRS sent on any of the aforementioned three types of symbols to achieve synchronization between the base stations. In fact, it needs to select a symbol that has the least impact on the service as the specific symbol.

Details are as follows.

1) A symbol where a control area is located cannot be selected.

A symbol 0 is a control area. The control area is configured for transmitting downlink control information (DCI) and a hybrid automatic repeat reQuest indicator (HARQ indicator). The DCI includes control information of a downlink channel and scheduling information of an uplink channel. The HARQ indicator includes a feedback for a previous uplink channel.

In one embodiment, if the symbol where the control area is located is selected to perform synchronization between the base stations, service data of multiple subframes before and after it can be affected, and the loss is spread, generating a large influence. Therefore, the symbol 0 cannot be selected.

2) A symbol where a physical downlink shared channel (PDSCH) is located is selected.

Meanwhile, it also needs to avoid symbols for transmitting important signals such as a broadcast signal and a paging signal, and avoid symbols for transmitting signals in a fixed cycle.

Therefore, considering the above conditions comprehensively, symbols 4 and 7 in the special subframe may be selected to perform synchronization between the base stations.

Step 320: the slave base station performs synchronization between the slave base station and the master base station according to the received CRS.

In one embodiment, the synchronization between the base stations may include time synchronization and frequency synchronization. Synchronization information required to achieve the two types of synchronization may be obtained by demodulating the CRS sent by the master base station.

In the embodiments of the present disclosure, when step 320 is executed, after obtaining the CRS sent by the master base station, the slave base station may synchronously adjust a time domain position of a frame header locally maintained by the slave base station based on time synchronization information carried by the CRS, and synchronously adjust a vibrating frequency of a local crystal oscillator of the slave base station based on frequency synchronization information carried by the CRS. In this way, synchronization between the base stations is successfully accomplished.

On the other hand, in the above embodiments, to ensure that the slave base station can successfully receive, on the specific symbol in the special subframe, the CRS sent by the master base station, further, the slave base station may, within a first duration before a start point of the specific symbol of the special subframe, perform switching from a transmitting state to a receiving state; next, the slave base station may receive, on the specific symbol of the special subframe, the CRS sent by the master base station, and perform synchronization between the slave base station and the master base station; and then, the slave base station may, within a second duration after an end point of the specific symbol, perform switching from the receiving state to the transmitting state.

Figure 5:
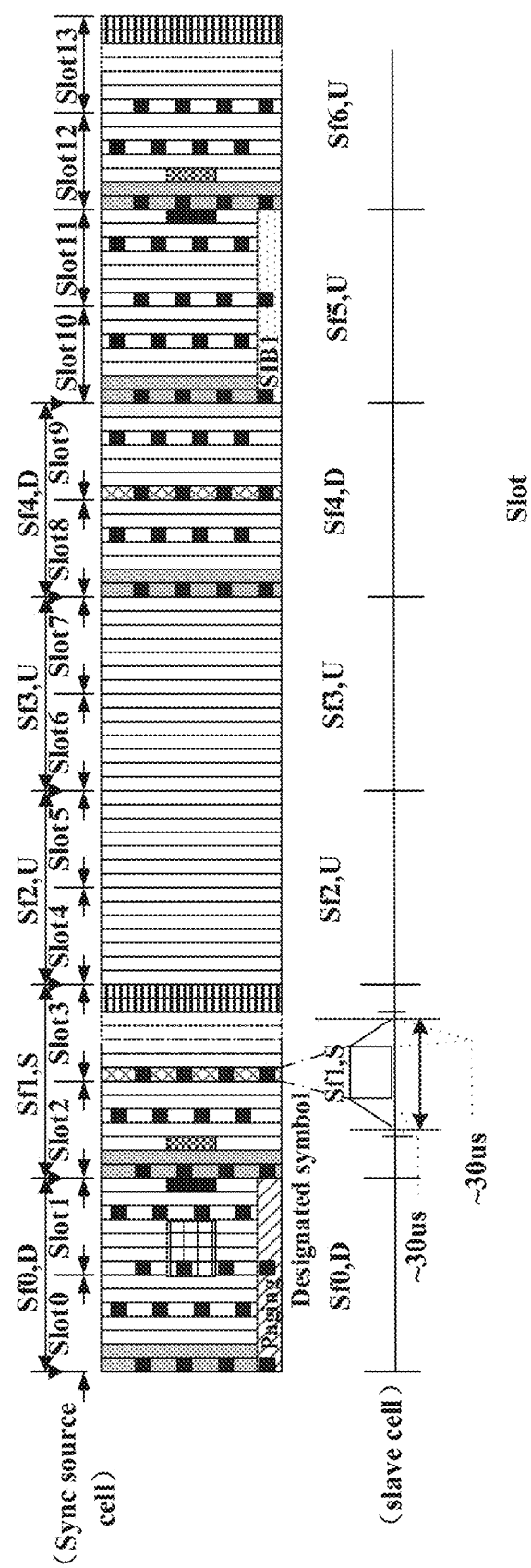
FIG. 5 is a schematic diagram of air interface listening by using a special sub-slot in an embodiment of the present disclosure.

For example, referring to FIG. 5, for the specific symbol (i.e. symbol 7) in the special subframe (i.e. Sf1, S), the base station switches from the transmitting state to the receiving state within 30 us before the symbol 7; next, the slave base station receives, on the symbol 7, the CRS sent by the master base station through the downlink pilot symbol, and performs synchronization; and then the slave base station can switch from the receiving state back to the transmitting state within 30 us after the symbol 7.

Referring to FIG. 4B, the slave base station and the master base station are synchronized. If it is determined that the synchronization is lost, another neighboring base station is reselected as a master base station. A special subframe ratio is one of judgment conditions for the slave base station to select the master base station. The slave base station usually selects a neighboring base station with a consistent special subframe ratio as the master base station. In networking, the special subframe ratio in the entire network is same, otherwise there is interference. As shown in FIG. 4B, for the slave base station, symbols 6, 7 and 8 are all downlink symbols (the symbol 7 carries the CRS signal, and other symbols carry the PDSCH). Therefore, the slave base station needs to send a downlink data signal on the symbol 6, then switch from the transmitting state to the receiving state at the end of the symbol 6, receive the CRS (i.e. the black square part) sent by the master base station on the symbol 7, and then switch from the receiving state to the transmitting state at the beginning of the symbol 8, and continue to send a downlink data signal.

In one embodiment, the values of the first duration and the second duration may be same or different, and, it also needs to follow the rule that the first duration and the second duration are less than the duration of a cyclic prefix (CP) used when the slave base station sends the downlink data signals on the symbols. In one embodiment, depending on the device implementation capability, if the aforementioned rule can be followed, only PDSCH data transmission on the symbol 7 is affected; and if the aforementioned rule cannot be followed, PDSCH data transmission on the symbols 6, 7 and 8 is affected.

This is because, in general, the slave base station needs "pre deltaA (that is, the first duration)+one symbol length (2048 sampling points)+post deltaB (that is, the second duration)". During the deltaA duration, the slave base station adjusts an RF transceiver from the transmitting state to the receiving state, so that the CRS of the master base station can be acquired. After the slave base station acquires the CRS and performs synchronization, the slave base station adjusts the RF transceiver from the receiving state to the transmitting state during the deltaB duration.

The master base station can copy a rear signal of sampled data signals and places it at the forefront of the sampled data signals as the cyclic prefix (CP), thus forming the downlink data signals to be finally transmitted. A length of one subframe is 1 ms. One subframe includes 2 slots. One slot includes 7 orthogonal frequency division multiplexing (OFDM) symbols, 1 CP with 160 sampling points, and 6 CPs with 144 sampling points, where one OFDM symbol has 2048 sampling points. A sampling period is $Ts=0.5$ $ms/(2048*7+6*144+160)=1/30720$ (ms).

In this way, the transmission sequence of a downlink data signal is "CP+data", where the duration of a conventional CP is 4.69 us. As deltaA occupies the end of the symbol 6 (the end has 144 sampling points as in a CP, thus having no influence), and deltaB occupies the beginning of the symbol 8, and thus as long as the duration of deltaA and deltaB is less than that of a CP, the slave base station listening to the CRS of the master base station in the symbol 7 only influences the CRS and downlink data signals (e.g., PDSCH signals) that should be transmitted on the symbol 7 without influencing the downlink data signals transmitted on the symbols 6 and 8.

The above process only uses the symbol 7 as an example. If the base station selects the symbol 4 as the specific symbol, the same rules need to be followed, and is not repeated here.

Further, after the CRS sent by the master base station is received, it also needs to calculate a reference signal receiving power (RSRP) of the CRS, determine that the currently calculated RSRP is lower than a preset synchronization detection protection threshold, and when the RSRPs of the master base station calculated in the slave base station during the last consecutive N times of synchronization are lower than the aforementioned synchronization detection protection threshold, it is determined that the synchronization has failed, and a master base station is reselected, where N is a preset integer.

In one embodiment, a synchronization detection protection threshold deltaT and a filter coefficient k are set to reduce the deviation introduced by a single calculation, and the filter coefficient is designed to be $k=1/8$. If the RSRP calculated at a single time exceeds deltaT, it is introduced as deltaT. If the RSRPs calculated at N consecutive times exceed deltaT, the synchronization is considered to have failed.

In actual applications, the signal strength of the master base station may be temporarily reduced due to some interference. Therefore, in the embodiment of the present disclosure, processing is performed by using the foregoing method, mainly including a smoothing solution to reduce the deviation introduced by a single CRS measurement, to avoid that the slave base station frequently changes the master base station due to a temporary decrease of the CRS signal strength.

Further, as the slave base station can switch to the receiving state on the specific symbols (for example, the symbols 4 and 7), a high layer of a protocol stack inside the slave base station, based on the preset synchronization tracking period, does not schedule PDSCH data during the synchronization.

Figure 6:
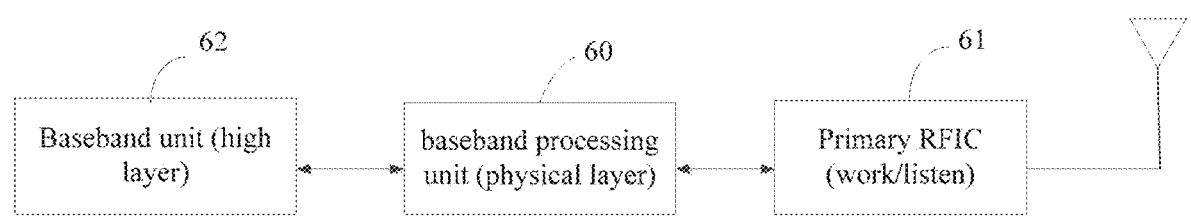
FIG. 6 is a functional structure diagram of a base station in an embodiment of the present disclosure.

Referring to FIG. 6, in embodiments of the present disclosure, a slave base station is provided. The slave base station includes at least a baseband processing element 60 and a primary radio frequency integrated circuit (RFIC) 61.

The baseband processing element 60 is configured to receive, on a specific symbol of a special subframe via a primary RFIC 61, a CRS sent by a master base station; and perform synchronization between the slave base station and the master base station according to the received CRS; and the primary RFIC 61 is configured to listen to the CRS sent by the master base station.

In one embodiment, the slave base station further includes: a baseband element 62 configured to, after startup, acquire neighboring cell information of neighboring base stations by scanning the neighboring base stations within a frequency band supported by the slave base station, before the baseband processing element 60 receives, on the specific symbol of the special subframe via the primary RFIC 61, the CRS sent by the master base station, where the neighboring cell information includes at least signal transmitting powers of the neighboring base stations.

The baseband processing element 60 is further configured to: select a neighboring base station with the highest signal transmission power and satisfying a preset power threshold among the acquired signal transmitting powers of the neighboring base stations, as the master base station.

In one embodiment, before receiving, on the specific symbol of the special subframe via the primary RFIC 61, the CRS sent by the master base station, the baseband processing element 60 is further configured to: determine that a preset synchronization tracking period has been reached.

The synchronization tracking cycle may be set by the baseband element 62.

In one embodiment, before receiving, on a specific symbol of a special subframe via a primary RFIC 61, a CRS sent by a master base station, the baseband processing element 60 is further configured to: within a first duration before a start point of the specific symbol, perform switching of the primary RFIC 61 from a transmitting state to a receiving state; and after performing synchronization between the slave base station and the master base station according to the received CRS, the baseband processing element is further configured to: within a second duration after an end point of the specific symbol, perform switching of the primary RFIC 61 from the receiving state to the transmitting state.

In one embodiment, the first duration and the second duration adopted by the baseband processing element 60 are smaller than a duration occupied by a cyclic prefix (CP) used when the primary RFIC 61 transmits a downlink data signal on each symbol.

In one embodiment, when performing synchronization between the slave base station and the master base station according to the acquired CRS, the baseband processing element 60 is configured to: synchronously adjust a time domain position of a frame header locally maintained by the slave base station based on time synchronization information carried by the CRS; and synchronously adjust a vibrating frequency of a local crystal oscillator of the slave base station based on frequency synchronization information carried by the CRS.

In one embodiment, the specific symbol adopted by the baseband processing element 60 is a symbol 4 or a symbol 7 in the special subframe.

In one embodiment, the baseband element 62 is further configured: not to schedule physical downlink shared channel (PDSCH) data during the synchronization.

In one embodiment, the baseband processing element 60 is further configured to: calculate an RSRP of the CRS, determine that the currently calculated RSRP is lower than a preset synchronization detection protection threshold, and when the RSRPs of the master base station calculated in the slave base station during the last consecutive N times of synchronization are lower than the synchronization detection protection threshold, determine that the synchronization has failed, and reselect another master base station.

In the embodiment of the present disclosure, a slave base station receives by a primary RFIC, on a specific symbol of a special subframe, a CRS sent by a master base station; and performs synchronization between the slave base station and the master base station according to the received CRS. The slave base station monitors the master base station by multiplexing the primary RFIC, a separate RF circuit is not needed, effectively reducing hardware costs; in addition, the slave base station monitors the master base station on the specific symbol of the special subframe, which can ensure that only data transmission on one symbol of the special subframe is lost in one synchronization tracking cycle, compared with configuring a MBSFN sub-frame, the slave base station uses more symbols for PDSCH signal transmission, effectively making the best use of radio resources.

Those skilled in the art should understand that the embodiments of the present disclosure can be provided as a method, a system or a computer program product. Therefore, the present disclosure may be in the form of an all-hardware embodiment, an all-software embodiment, or a software and hardware combined embodiment. Moreover, the present disclosure may also be in the form of a computer program product that can be implemented on one or more computer usable storage media (including but not limited to magnetic disk memories, CD-ROMs, optical memories) containing computer usable program codes.

The present disclosure is described with reference to the flow diagrams and/or block diagrams of the method, device (system) and computer program product of the embodiments of the present disclosure. It should be understood that each process and/or block in the flow diagrams and/or block diagrams, as well as combinations of processes and/or blocks in the flow diagrams and/or block diagrams can be implemented by computer program instructions. The computer program instructions can be provided to a processor of a general purpose computer, a special purpose computer, an embedded processor or other programmable data processing device to produce a machine, so that the instructions processed by the processor of the computer or other programmable data processing device generates a device for achieving functions specified in one or more processes of the flow diagrams and/or one or more blocks of the block diagrams.

The computer program instructions may also be stored in a computer readable memory that can instruct a computer or other programmable data processing device to operate in a specified manner, so that the instructions stored in the computer readable memory generates a manufacture containing an instruction device, and the instruction device achieves the functions specified in one or more processes of the flow diagrams and/or one or more blocks of the block diagrams.

The computer program instructions can also be loaded to a computer or other programmable data processing device, so that a series of operation steps are executed on the computer or other programmable data processing device to generate computer implemented processing, so that the instructions executed on the computer or other programmable data processing device provide steps for achieving functions specified in one or more processes of the flow diagrams and/or one or more blocks of the block diagrams.

What is claimed is:

1. A method for synchronization between base stations, comprising:
   receiving, by a slave base station, a cell reference signal (CRS) sent by a first master base station, on a specific symbol in a special subframe via a primary radio frequency integrated circuit (RFIC); and
   performing, by the slave base station, synchronization between the slave base station and the first master base station according to the received CRS;
   wherein before said receiving, by the slave base station, the CRS sent by the first master base station, on the specific symbol in the special subframe via the primary RFIC, the method further comprises:
   switching, by the slave base station, from a transmitting state to a receiving state within a first duration before a start point of the specific symbol; and
   after said performing, by the slave base station, synchronization between the slave base station and the first master base station according to the received CRS, the method further comprises:
   switching, by the slave base station, from the receiving state to the transmitting state within a second duration after an end point of the specific symbol;
   wherein the first duration and the second duration are smaller than a duration occupied by a cyclic prefix (CP) used when the slave base station transmits a downlink data signal on each symbol.

2. The method according to claim 1, wherein before said receiving, by the slave base station, the CRS sent by the first master base station, on the specific symbol in the special subframe via the primary RFIC, the method further comprises:
   acquiring, by the slave base station after startup, neighboring cell information of neighboring base stations by scanning the neighboring base stations within a frequency band supported by the slave base station;
   wherein the neighboring cell information comprises at least signal transmitting powers of the neighboring base stations; and
   selecting, by the slave base station, a neighboring base station from the neighboring base stations as the first master base station; wherein the selected neighboring base station has a highest signal transmitting power among the acquired signal transmitting powers of the neighboring base stations and the highest signal transmitting power satisfies a preset power threshold.

3. The method according to claim 1, wherein before said receiving, by the slave base station, the CRS sent by the first master base station, on the specific symbol in the special subframe via the primary RFIC, the method further comprises:
   determining, by the slave base station, that a preset synchronization tracking period has been reached.

4. The method according to claim 1, wherein the specific symbol is a symbol 4 or a symbol 7 in the special subframe.

5. The method according to claim 1, further comprising:
   not scheduling, by the slave base station, physical downlink shared channel (PDSCH) data during the synchronization.

6. The method according to claim 1, further comprising:
   calculating, by the slave base station, a reference signal received power (RSRP) of the CRS;
   determining, by the slave base station, that the synchronization has failed when the calculated RSRP is smaller than a preset synchronization detection protection threshold, and RSRPs of the first master base station calculated in the slave base station during the last consecutive N times of synchronization are smaller than the preset synchronization detection protection threshold, wherein N is a preset integer greater than 1; and
   reselecting, by the slave base station, a second master base station in response to that the synchronization has failed.

7. A slave base station, comprising at least a baseband processing element and a primary radio frequency integrated circuit (RFIC), wherein:
   the baseband processing element is configured to receive a cell reference signal (CRS) sent by a first master base station on a specific symbol of a special subframe via the primary RFIC; and perform synchronization between the slave base station and the first master base station according to the received CRS; and
   the primary RFIC is configured to listen to the CRS sent by the first master base station;
   wherein before receiving the CRS sent by the first master base station, on the specific symbol in the special subframe via the primary RFIC, the baseband processing element is further configured to:
   switch from a transmitting state of the primary RFIC to a receiving state within a first duration before a start point of the specific symbol;
   after performing synchronization between the slave base station and the first master base station according to the received CRS, the baseband processing element is further configured to:
   switch from the receiving state of the primary RFIC to the transmitting state within a second duration after an end point of the specific symbol;
   wherein the first duration and the second duration adopted by the baseband processing element are smaller than a duration occupied by a cyclic prefix (CP) used when the primary RFIC transmits a downlink data signal on each symbol.

8. The slave base station according to claim 7, further comprising:
   a baseband element configured to, after startup, acquire neighboring cell information of neighboring base stations by scanning the neighboring base stations within a frequency band supported by the slave base station, before the baseband processing element receives the CRS sent by the first master base station on the specific symbol in the special subframe via the primary RFIC; wherein the neighboring cell information comprises at least signal transmitting powers of the neighboring base stations;

wherein the baseband processing element is further configured to:

select a neighboring base station from the neighboring base stations as the first master base station, wherein the selected neighboring base station has a highest signal transmitting power among the acquired signal transmitting powers of the neighboring base stations and the highest signal transmitting power satisfies a preset power threshold.

9. The slave base station according to claim 7, wherein before receiving the CRS sent by the first master base station on the specific symbol in the special subframe via the primary RFIC, the baseband processing element is further configured to:

determine that a preset synchronization tracking period has been reached.

10. The slave base station according to claim 7, wherein the specific symbol adopted by the baseband processing element is a symbol 4 or a symbol 7 in the special subframe.

11. The slave base station according to claim 7, wherein the baseband element is further configured:

not to schedule physical downlink shared channel (PDSCH) data during the synchronization.

12. The slave base station according to claim 7, wherein the baseband processing element is further configured to:

calculate a reference signal received power (RSRP) of the CRS;

determine that the synchronization has failed when the calculated RSRP is smaller than a preset synchronization detection protection threshold, and RSRPs of the first master base station calculated in the slave base station during the last consecutive N times of synchronization are smaller than the preset synchronization detection protection threshold, wherein N is a preset integer greater than 1; and reselect a second master base station in response to that the synchronization has failed.

13. A method for synchronization between base stations, comprising:

receiving, by a slave base station, a cell reference signal (CRS) sent by a first master base station, on a specific symbol in a special subframe via a primary radio frequency integrated circuit (RFIC); and performing, by the slave base station, synchronization between the slave base station and the first master base station according to the received CRS;

wherein before said receiving, by the slave base station, the CRS sent by the first master base station, on the specific symbol in the special subframe via the primary RFIC, the method further comprises:

switching, by the slave base station, from a transmitting state to a receiving state within a first duration before a start point of the specific symbol; and after said performing, by the slave base station, synchronization between the slave base station and the first master base station according to the received CRS, the method further comprises:

switching, by the slave base station, from the receiving state to the transmitting state within a second duration after an end point of the specific symbol;

wherein said performing, by the slave base station, synchronization between the slave base station and the first master base station according to the received CRS comprises:

synchronously adjusting, by the slave base station, a time domain position of a frame header locally maintained by the slave base station based on time synchronization information carried by the CRS; and synchronously adjusting, by the slave base station, a vibrating frequency of a local crystal oscillator of the slave base station based on frequency synchronization information carried by the CRS.

* * * * *